Sept. 8, 1964 R. W. HOUSER 3,147,597

PNEUMATIC SELECTOR MECHANISM

Filed March 18, 1963 4 Sheets-Sheet 1

FIG. I.

INVENTOR
Roy W. Houser

BY Birch and O'Brien

ATTORNEYS

INVENTOR
Roy W. Houser
BY Birch and O'Brien
ATTORNEYS

PNEUMATIC SELECTOR MECHANISM

Filed March 18, 1963 4 Sheets-Sheet 3

INVENTOR
Roy W. Houser
BY Birch and O'Brien
ATTORNEYS

Sept. 8, 1964 R. W. HOUSER 3,147,597

PNEUMATIC SELECTOR MECHANISM

Filed March 18, 1963 4 Sheets-Sheet 4

INVENTOR.
Roy W. Houser

BY Birch and O'Brien

ATTORNEYS

United States Patent Office 3,147,597
Patented Sept. 8, 1964

3,147,597

PNEUMATIC SELECTOR MECHANISM

Roy W. Houser, Orange, Calif., assignor to Robertshaw Controls Company, a corporation of Delaware Filed Mar. 18, 1963, Ser. No. 265,742
11 Claims. (Cl. 60—60)

This invention relates to a selecting mechanism for a multi-cycle pneumatic programmer and in particular to an electro-pneumatic mechanical device in which a particular cycle is selected by a simple push button operation.

An object of this invention is to control pneumatic and electric devices by a mechanical selector mechanism.

Another object of this invention is to initiate actuation of pneumatic and electric devices by manual operation of a selector mechanism and to control operation of such devices by automatic operation of the selector mechanism.

Another object of this invention is to rotate a cycle searching disc in one direction by the dual direction drive of a selector mechanism.

This invention has another object in that a pneumatically operated search motor is actuated by a selector mechanism to rotate a cycle searching disc of the selector mechanism.

This invention has another object in that search nodes on a cycle searching disc are spaced from each other in a cycle selecting pattern and in a cycle initiating pattern.

It is another object of this invention to radially space a plurality of search nodes on a cycle searching disc for cooperation with a sensor arm positioned by a selector mechanism.

It is another object of this invention to circumferentially space a plurality of search nodes on a cycle searching disc to stop the disc drive at a predetermined position corresponding to a selected programming cycle.

This invention has another object in that the completion of a selected pneumatic programming cycle effects a terminating operation of the selector mechanism.

Another object of this invention is to latch a push button selector in a search position by manual operation and to latch such selector in a cycle operating position by automatic operation.

Another object of this invention is to automatically release a depressed push button of a selector mechanism by a clearing operation when a second push button is depressed.

In a preferred embodiment of the present invention, a multicycle selector mechanism initiates electric and pneumatic circuits to commence a searching operation for the selected cycle. The manual selection of the cycle disposes a cycle selector sensing means in operative position relative to a pneumatically operated searching means and upon completion of the searching operation the searching means is selectively positioned representing a selected programming cycle and the selector mechanism is automatically moved to an operating position to divert the pneumatic circuit to a programming timer.

Additional features and advantages of the present invention will become apparent from the following description of a preferred embodiment taken in connection with the accompanying drawings wherein.

Figure 1:
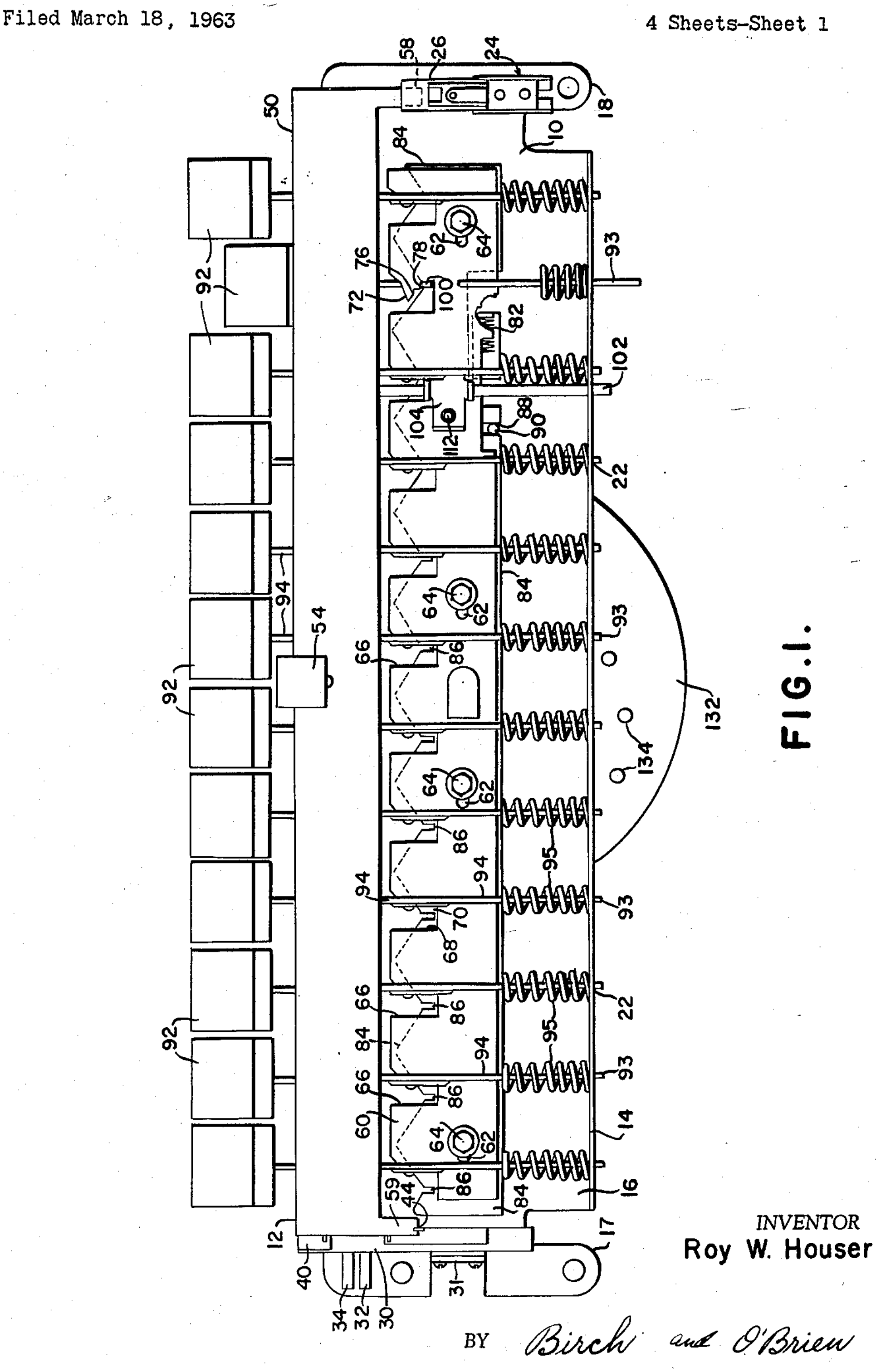
FIGURE 1 is a front elevation view of a push button device embodying this invention in which the cover is removed.
Figure 3:
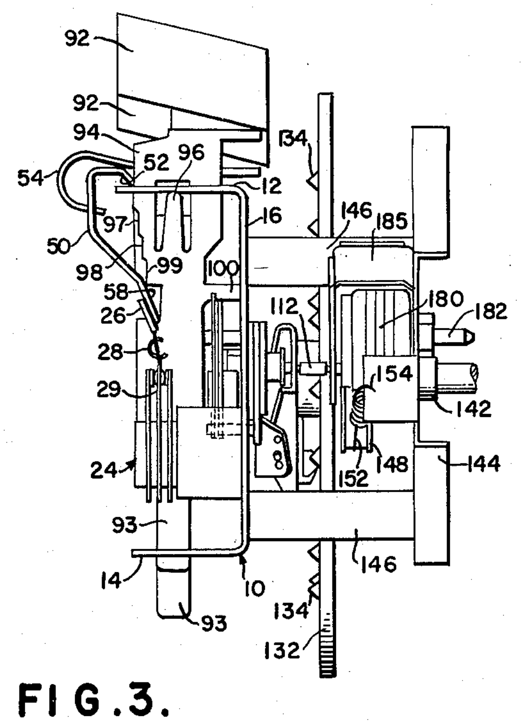
FIGURE 3 is an enlarged side elevation view taken from the right hand side of FIGURE 1.

Referring first to FIGURE 1, there is illustrated a push button selector mechanism mounted on a main frame 10. The frame 10 has a generally U-shape cross section defined by upper and lower horizontal plates 12 and 14 connected by a vertical plate 16 which carries apertured end flanges 17–18 for installation purposes. The upper plate 12 is provided with a plurality (twelve in this model) of equally spaced rectangular slots 20 which are in alignment with a similar plurality of smaller rectangular slots 22 in the lower plate 14. An electric switch 24 is fastened to the end flange 18 in such a manner that its actuating arm 26 extends upwardly toward the top plate 12. As is illustrated in FIGURE 3, the electric switch 24 includes a snap acting mechanism in the form of a C-shaped rolling spring 28 operatively disposed between the actuating arm 26 and a contact carrying movable switch arm 29 which is thereby moved between switching positions with a snap action in response to movement of the actuating arm 26.

A pneumatic flow control device or diverter valve 30 is fastened as by screws to a tab 31 inwardly bent from the central portion of end flange 17. The diverter valve 30 includes a common port 32 and a pair of diverter ports 34 and 36 alternately communicating therewith. Transfer of a valve element (not shown) in the diverter valve 30 is accomplished by means of valve actuator 38 having a U-shape configuration so as to be slidably mounted on the valve body. One edge of the U-shaped actuator 38 is integrally formed with a transversely disposed spring strip 40 the upper portion of which is inclined relative to its lower portion which is an offset portion 42 secured to a lower portion of the valve body. Because of its offset mounting and natural resiliency the strip 40 is normally biased to one position and is moved to another position by means of a wire link 44 having one end attached to an intermediate portion of the strip 40. A guide bolt 46 is fixed to the exterior of the valve body and its shank extends through a guiding aperture located in the upper portion of the strip 40 in order to guide the movement of the strip 40.

Operation of the electric switch 24 and the diverter valve 30 is accomplished by an elongated cammed lever 50 that extends along the free edge of upper frame plate 12. A plurality of spaced tabs 52 (FIG. 2) along the upper edge of the cammed lever 50 are fulcrumed along the top of upper plate 12 and the entire lever 50 is biased by a C-shaped leaf spring 54 centrally fixed to the top of upper plate 12 as by a fastening screw 56. The lower end of lever 50 is bent inwardly so as to extend under the upper plate 12 and as shown in FIGURE 1 has a projection on each side end; one projection 58 engages the switch actuator 26 and the other projection 59 is connected to the wire link 44 for moving the diverter valve actuator 38.

Figure 5:
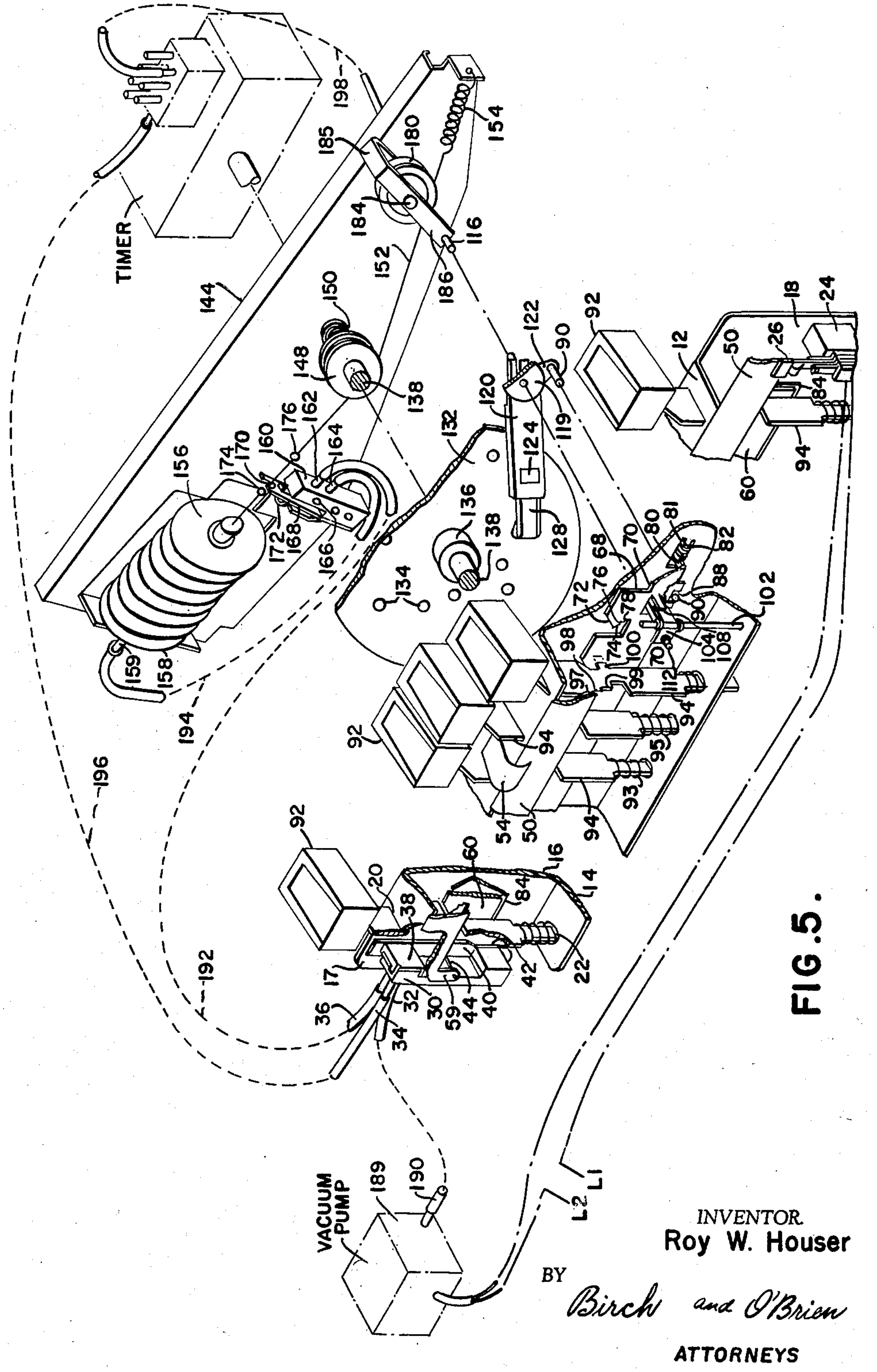
FIGURE 5 is a schematic diagram, with parts broken away, of the pneumatic and electrical circuits for the selector device of FIGURE 1.

As is illustrated in FIGURE 1, the U-shaped frame 10 defines a channel housing for a generally rectangular latch bar or plate 60. A plurality of elongated slots 62 in the latch bar 60 receive the shanks of a similar plurality of bolts 64 which are secured to the frame plate 16 whereby the latch bar 60 is slidably mounted relative to the main frame 10. The upper edge of latch bar 60 has a plurality (twelve) of equally spaced notches 66, each of which has the same configuration so only one will be described in detail. As best shown in FIGURES 1 and 5 each notch 66 has a straight left hand edge 68 and a straight bottom edge 70. The right hand edge of notch 66 has a first sloping surface 72 and a second reversed sloping surface 74 connecting with an upper horizontal ledge 76 which is stepped to a lower horizontal ledge 78 spaced above the bottom edge 70. Adjacent its left hand end, the latch bar 60 has a perpendicular tab 80 disposed for longitudinal movement in a rectanagular slot 81; a coil spring 82 is disposed in the slot 81 and engages the tab 80 for normally biasing the latch bar 60 to the left as viewed in FIGURES 1 and 5.

A substantially rectangular cam bar 84 is also slidably mounted on the shanks of bolts 64 and is positioned between the latch bar 60 and the frame plate 16. Along its top edge the cam bar 84 is notched with twelve recesses 86 which are alignable with the twelve latch bar notches 66 and each of which is provided with sloping surfaces leading from the open end of such recess to the top edge of cam bar 84. The recesses 86 are not equally spaced but are unevenly arranged from each other for a purpose to be described more fully hereinafter. Along its lower edge, the cam bar 84 has a slot 88 which receives a positioning pin 90 for a purpose to be described hereinafter. The adjacent portions of the latch bar 60 and cam bar 84 are cut away in the areas of the pin 90 and tab 80 so as not to interfere with the relative sliding movement thereof.

Arranged along the top of the upper plate 16 are a plurality of push buttons 92 which in this instance number twelve to represent the twelve cycles of operation to be selected. Since the push buttons are identical, only one will be described in detail. Each push button 92 includes a flat strip 94 having an upper end extending through the slot 20 in the upper plate 12; the strip 94 and slot 20 have the same configuration in cross section to facilitate assembly through the upper plate 12. After such assembly, a tab 96 on the strip 94 is longitudinally bent outwardly to engage the undersurface of upper plate 12 and thus limit the outward movement of the push button 92. The lower end of push button strip 94 has a reduced portion 93 shaped so as to conform to slot 22 for extension therethrough; a coil spring 95 encircles the reduced portion 93 and is mounted in compression between the upper surface of plate 14 and the shoulder on strip 94 whereby the push button 92 is normally biased upwardly. The front edge of push button strip 94 is provided with three cam levels 97, 98 and 99 which cooperate with the lower edge of lever 50 for camming the same to selected operating positions. The rear edge of push button strip 94 is provided with a rearwardly extending tab 100 that cooperates with recess 86 and notch 66 for moving the cam bar 84 and latch bar 60, respectively, to selected operating positions.

As is shown in FIGURE 1, an axle shaft 102 is mounted between the upper and lower plates 12 and 14 so as to be positioned in front of the latch bar 60. A bell crank lever 104 is rotatably carried by the shaft 102 with one arm 106 disposed adjacent an operating tab 108 bent outwardly from the latch bar 60. The other arm 110 of the bell crank lever 104 is suitably apertured to encircle a latch release rod 112 and contact an end boss 114 thereon. The bell crank arm 106 is disposed on the left side (FIG. 2) of the operating tab 108, and is thus moved away therefrom by movement of the latch bar 60 to the right by push button operation; however, upward movement of rod 112 causes clockwise pivoting of bell crank lever 104 so that arm 106 moves tab 108 and latch bar 60 to the right.

The latch release rod 112 slidably extends through a pivot bushing and nut assembly mounted on the vertical frame plate 16 and such extension of rod 112 has an intermediate necked-down portion 114 and an end necked-down portion 116. The pivot bushing and nut assembly includes a nut 118 on front side of plate 16 and a pivot bushing 119 on the opposite side, which provides a pivot mounting for a sweep arm 120. As best shown in FIGURE 5, the sweep arm 120 has a rear extension 122 integrally connected to the end of the positioning pin 90 so that movement of the positioning pin 90 causes the arm 120 to pivot about the axis defined by rod 112. Movement of the sweep arm 120 is guided by a shoe 124 which engages the rear surface of plate 16 and surface contact is maintained by a wire spring 125 carried by the pivot bushing 119 and normally biasing the sweep arm toward such rear surface. Adjacent its free end, the side flanges of the channel shaped arm 120 carries a pivot pin 126 on which a channel shaped sensor arm 128 is pivotally mounted intermediate its ends by means of its side flanges. A plurality of spaced aligned apertures in the side flanges of the arms 120 and 128 permit adjustable mounting of the pivotal connection therebetween. The rear end of sensor arm 128 is bifurcated so as to be loosely connected to the necked-down portion 115 of latch rod 112 whereby pivotal movement of the sensor arm 128 effects axial movement of the latch rod 112. On its free end portion, the sensor arm 128 carries a tip element 130 made of a plastic material, such as Nylon; the tip element 130 has three sloping sides terminating in a contacting edge of small area to facilitate its movement with a cooperating surface.

The sensor arm tip 130 cooperates with a rotating disc 132 and a plurality (twelve in this instance) of nodes 134 thereon which are spaced radially and circumferentially from each other. The disc 132 has a collar 136 keyed to a tape drive shaft 138 that is rotatably mounted in frame plate 16 by means of a bushing 140. The drive shaft 138 has a second mounting in the form of a bushing 142 fixed in a generally rectangular mounting bracket 144. A plurality of spacers and screws 146 form mounting posts for attaching the bracket 144 to the frame plate 16. Between the bracket 144 and the rear face of disc 132, the drive shaft 138 is provided with a cable drum 148 and a one way spring clutch 150 whereby the drive shaft 138 is rotated with the drum 148 in one direction only and the drive shaft is freed when the drum 148 rotates in the return direction.

A drive cable 152 is wound on the drum and has one end connected to a tension coil spring 154 which is carried on the right hand end of bracket 144. The opposite end of cable 152 is attached to the movable end of an expansible and contractible bellows 156 which has an opposite fixed end 158 secured to the left hand end of bracket 144. The bellows 156 and fixed element 158 comprise an air search motor which has a pneumatic port 159 extending through the fixed element 158 to communicate with the interior of the bellows 156. Contraction of the bellows 156 pulls the cable 152 to the left (FIG. 5) causing clockwise rotation of the drum 148 which through the one way spring clutch 150 effects clockwise rotation of the drive shaft 138 and disc 132. Upon expansion of the bellows 156, the cable 152 is returned to the right by the action of cable spring 154 which also maintains the cable 152 tightly wound on the drum 148; the return movement of cable 152 effects counterclockwise rotation of the drum 148 and such rotation disengages the one way spring clutch 150 from its driving connection with drive shaft 138 so there is no counter-clockwise rotation of the disc 132.

Between the drum 148 and air search motor 156, a stepper valve 160 is attached to the mounting bracket 144. In order to illustrate the pneumatic connections more clearly, the stepper valve 160 is diagrammatically illustrated in FIGURE 2 as being separated from mounting bracket 144. The stepper valve 160 includes a pair of pneumatic flow ports 162 and 164 and an atmospheric bleed port 166. The ports 164 and 166 are normally in communication with each other by means of a movable valve element (not shown) which transfers to an actuated position wherein the bleed port 166 is blocked off and communication is established between the other two ports 162 and 164. Actuation of the stepper valve element is accomplished by an actuating arm 168 in the form of a spring strip having a lower end secured to the valve body and having a bifurcated upper end 170 straddling the cable 152. The stepper valve 160 includes a snap acting device in the form of a C-shaped rolling spring 172 operatively disposed between the actuating arm 168 and a bracket on the valve body. The valve actuating arm 168 is moved by means of spaced beads 174–176 fixed to the cable 156 and adapted for alternate engagement with the bifurcated end 170 in response to reciprocation of the cable 156.

Figure 4:
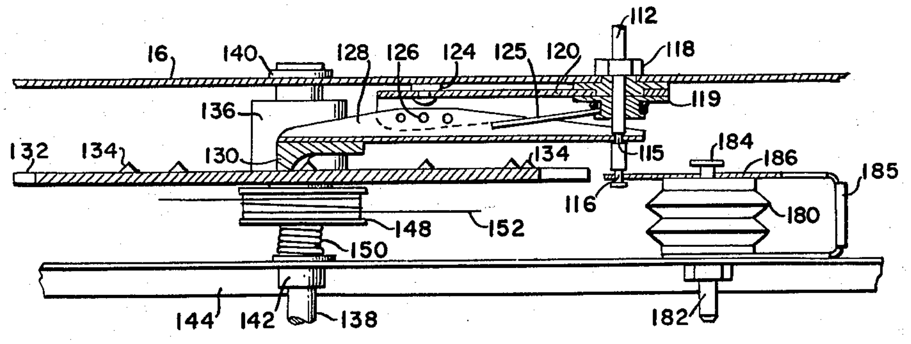
FIGURE 4 is a partial section showing certain details of FIGURE 2 on an enlarged scale.

Adjacent the right hand end of mounting bracket 144, an end-of-cycle air motor 180 is fastened thereto. The air motor 180 is in the form of a bellows having a port 182 on its fixed end communicating with its interior and an operating button 184 on its movable end. A generally U-shaped bracket 185 is attached to the bracket 144 with the air motor 180 and has an apertured operating leg 186 (FIG. 4) cooperating with the bellows button 184. The free end of operating leg 186 is apertured to form a loose connection with the necked-down portion 116 on the end of latch rod 112.

Figure 2:
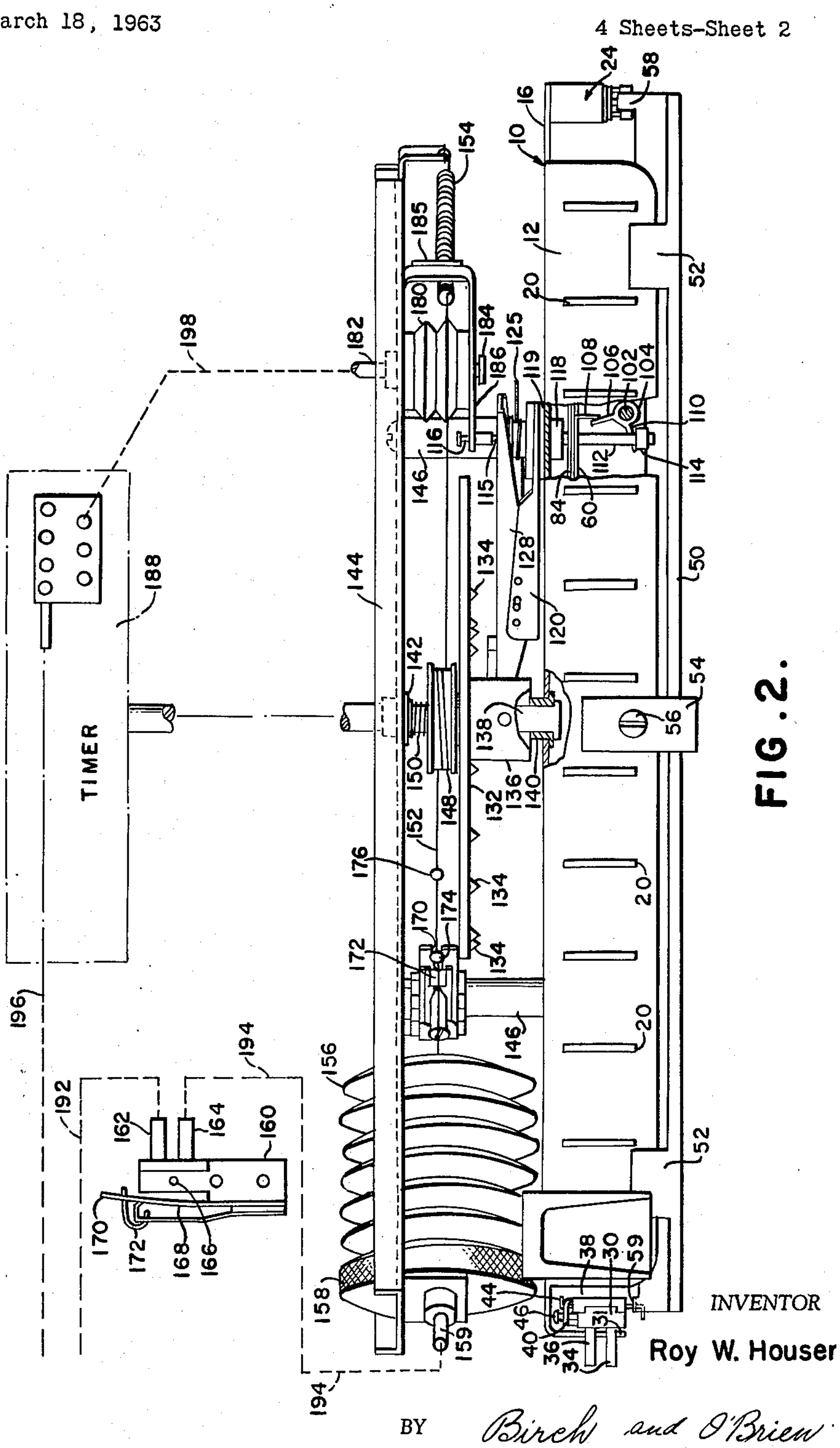
FIGURE 2 is a top plan view of FIGURE 1 with the addition of connections to pneumatic components.

As is shown in FIGURE 2, a timer mechanism 188 includes a programming tape (not shown) operatively connected to the end of drive shaft 138 and is moved thereby so as to position the selected program against the conduits (not shown) of the reading head block. Pneumatic flow control means are arranged on the programming tape in a predetermined manner to conform to a desired cycle of operation and are grouped on the tape to define a plurality (twelve in this case) of cycles. The shaft 138 thus positions the tape so that a selected cycle is in operation position relative to the timer reading head. The timer 188 may be driven by any suitable means, such as an electric motor (not shown) so as to move the programming tape through its selected program. Timed movement of the tape establishes pneumatic flows for a plurality of conduits extending out of the reading head and connected to a plurality of pneumatically operated control devices (not shown) which are thus operated in a particular sequence of operation in accordance with the selected cycle.

The pneumatic source connected to the timer 188 is supplied by a vacuum pump 189 which is electrically operated. The vacuum pump 189 and the switch 24 are electrically connected in series as shown by the electrical conductors (FIG. 5) which are connected to a source of power by lead lines $L_1$ and $L_2$.

A pneumatic circuit evacuated by the vacuum pump 189 may be traced therefrom through a conduit 190 to the common port 32 of the diverter valve 30 and thence to parallel circuits depending upon the position of the diverter valve actuator 38. One parallel circuit is continued from common port 32 through diverter port 34 and conduit 196 to the main port of the timer 188; the timer 188 and its programming tape establishes a plurality of pneumatic flows between its main port connected to conduit 196 and the plurality of reading head conduits, one of which is connected to a conduit 198 leading to the port 182 of the air motor 180. The second parallel circuit is continued from common port 32 through diverter port 36, conduit 192, the pneumatic flow ports 162 and 164 in stepper valve 160, conduit 194 and pneumatic port 159 to the interior of the air search bellows 156. This second parallel circuit may be interrupted by actuation of the stepper valve 160 whereby the pneumatic flow port 162 is blocked off and the pneumatic flow port 164 communicates with the atmospheric bleed port 166.

*Operation*

Operation of the pneumatic selector mechanism is commenced by fully depressing one of the push buttons 92 to select the desired cycle. Initial movement of push button 92 effects a clearing action in that the rear edge tab 100 engages the sloping surface 72 causing the latch bar 60 to slide to the right as viewed in FIGURE 1. The rightward movement of the latch bar 60 similarly displaces its twelve notches 66 so that the rear edge tab 100 of any other push button, which may be in a depressed position, is cleared from the notch surface 74 and ledges 76 and 78 whereby such other push button is released for upward return movement by the bias of coil spring 95. As the rear edge tab 100 is moved downwardly past the sloping surface 74 and ledge 76 toward the lower ledge 78 during final movement of push button 92, the return spring 82 imparts a leftward movement to the latch bar 60 until the lower right edge of notch 66 engages the side of rear edge tab 100 which is thus positioned so as to be held in a fully depressed condition by the lower ledge 78.

During final movement of the push button 92, the rear edge tab 100 engages the sloping surface leading to recess 86 in the cam bar 84, which is thus cammed to the right as viewed in FIGURE 1, so that in its fully depressed condition, the rear edge tab 100 is disposed in the cam bar recess 86 and thus latches the cam bar 84 in its selected position. Because the twelve recesses 86 in the cam bar 84 are unevenly spaced from each other along the longitudinal axis, the cam bar 84 may be moved rightwardly or leftwardly depending upon its position from a previous use and may be moved to a selected one of twelve different positions depending upon which one of the twelve push buttons 92 is selected. Assuming a rightward movement, the positioning pin 90 in the cam bar slot 88 (FIG. 1) is also rightwardly moved to a selected position whereby the arm extension 122 on the end of pin 90 is simultaneously rotated about the axis defined by rod 112. It is thus apparent that the longitudinal movement of the cam bar 84 to a selected position, simultaneously effects a corresponding rotary movement of the sweep arm 120 so that the sensor arm 128 is selectively positioned along an arcuate path across the noded face of disc 132. During the sweeping movement of sensor arm 128, if one or more of the nodes 134 are in the path of the sensor arm tip 130, the cone shape of the node 134 and the matching slope of the tip 130 will permit the tip 130 to sweep with minimum interference to its selected position.

The twelve nodes 134 correspond to the twelve cycles represented by the twelve push buttons 92 and such nodes are radially spaced on the disc 132 so as to present twelve different points to be engaged by the twelve different positions of the sensor arm tip 130. As is apparent from FIGURE 5, the twelve nodes 134 are also circumferentially spaced from each other around the disc 132 so as to represent twelve different rotary positions of the drive shaft 138. The rotary movement of drive shaft 138 effects a corresponding movement of the programming tape in the timer 188 so that selective rotary positioning of the disc 132 and drive shaft 138 simultaneously causes selectively positioning of the programming tape. As soon as the particular cycle is selected, as represented by the position of the programming tape, the timer 188 may be energized for further operation of the tape.

When the push button 92 is latched in its fully depressed position, the upper cam level 97 on the front edge of push button strip 94 is engaged by the lower edge of lever 50 which is thus cammed to its initial operating position. In this position, the lever projection 58 operates the switch actuator 26 whereby the switch 24 completes an energizing circuit for the motor of the vacuum pump 189; at the same time the lever projection 59 and its wire link 44 moves the diverter valve actuator 38 against the bias of strip 40 whereby a vacuum flow is established from conduit 190 through the diverter valve ports 32 and 36, the conduit 192, the stepper valve ports 162 and 164, and conduit 194 to the air search motor 156 which is thus evacuated. Upon its evacuation, the air search bellows 156 contracts and pulls the cable 152 against the bias of spring 154 to the left as viewed in FIGURE 5. Final cable movement to the left causes the drive shaft 138 to be rotated clockwise so that the disc 132 and nodes 134 are rotated relative to the sensor arm tip 130.

If the search is not completed with the first rotary movement of disc 132, the stepper valve actuator end 170 is operated by the cable bead 176 so that the search motor conduit 194 communicates with the atmospheric port 166. The interior of bellows 156 is subjected to atmospheric pressure and is expanded. Upon expansion of the bellows 156, the cable 152 is returned to the right by its return spring 154, however, there is no rotary movement imparted to the drive shaft 138 because the one way clutch 150 is disengaged. The final rightward movement of the cable 152 causes the cable head 174 to operate the stepper valve actuator end 170 so that the stepper valve ports 162 and 164 are again in communication to cause a second evacuation of the bellows 156. The repeated operation of the air search motor 156 by the stepper valve 160 continues until the search is completed as indicated by engagement of the selected node 134 with the sensor arm tip 130.

The search ends when the selected node 134 causes the sensor arm tip 130 to pivot the sensor arm 128 counterclockwise in FIGURE 2 (clockwise as viewed in FIGURE 4) about the pivot pin 126. The rear end of arm 128 is thus moved upward causing a similar movement of the latch rod 112. As the latch rod 112 moves inwardly (FIG. 5) the bell crank lever arms 104 and 106 are pivoted clockwise about the shaft 102 so that operating tab 108 and latch bar 60 are shifted to right. Accordingly, the latch bar ledge 78 is moved away from the rear edge tab 100 whereupon the coil spring 95 biases the push button strip 94 upwardly until the rear edge tab 100 is stopped against the upper ledge 76 on the latch bar 60. Since the rear edge tab 100 is now moved upwardly out of the recess 86, the cam bar 84 no longer restrains positioning pin 90 so that under the bias of spring 125 the pivot bushing permits the sweep arm 120 to return without affecting the longitudinal position of the rod 112 because of the loose connection at 115.

The ledge 76 represents an intermediate or operating position for the push button 92 and its front edge cam 98 is now in engagement with the cammed lever 50. In the intermediate position of the cammed lever 50, the end projection 58 has not been moved far enough to actuate the switch 24 because of the lost motion connection of the rolling spring 28; however, the end projection 59 releases the spring strip 40 which causes the actuator 38 to shift the diverter valve to its normal position in which ports 32 and 34 are in communication. Pneumatic flow is now established for the timer 188 and may be traced from the vacuum pump 189 through conduit 190, the diverter valve ports 32 and 34, the conduit 196 to the main port of the timer 188. The pneumatic flow may now be utilized to actuate a switch for energizing the electric motor of the timer 188 whereupon the selected portion of the programming tape is moved through the timed cycle for sequentially actuating the various pneumatic control devices connected to the various conduit ports of the timer reading head.

When the programming tape reaches the end of its timed cycle, the end of cyle air motor 180 is evacuated through the conduit 198 which is in communication with the vacuum pump conduit 196 by means of the programming tape in the timer 188. Upon such actuation, the air motor 180 is contracted and the bracket leg 186 is flexed toward the mounting bracket 144. As described above the latch rod 112 was moved to an intermediate position by the sensor arm 128 acting on the necked down portion 115. The latch rod 112 is now moved further inwardly (FIG. 5) to a third position by the end of bracket leg 186 acting on the necked down portion 116; such inward movement causes further clockwise pivoting of bell crank lever arms 104 and 106 whereby the operating tab and latch bar 60 are shifted further to the right. Accordingly, the latch bar ledge 76 is moved away from the rear edge tab 100 which is then cleared for upward movement to its original position. The return spring 95 imparts a biasing force to the push button strip 94 for its upward movement and because of the sloping surface 74 on the latch bar 60, the rear edge tab 100 is assured of being released therefrom.

As soon as the push button 92 is returned to its undepressed condition, the cammed lever 50 is biased by its spring into engagement with the lower cam level 99 on the push button strip 94. As the cammed lever 50 is returned to its original position the end projection 58 actuates the switch 24 whereby the vacuum pump 189 is shut off. The end of cycle air motor 180 now expands and returns the latch rod 112 to its original position so that the latch bar 10 may be returned to the left by its coil spring 82. The entire selector mechanism is now disposed for its next selecting operation.

Inasmuch as the preferred embodiment of the present invention is subject to many changes and modifications, it is intended that all matter contained in the foregoing description and shown on the drawing shall be interpreted as illustrative and not in a limiting sense.

What is claimed is:

1. Selector apparatus for a multi-cycle system comprising pneumatic circuit means, searching means operatively connected to said pneumatic circuit means, a plurality of selector elements corresponding to a similar number of cycles in the system, each of said selector elements being movable to a searching position and to an operating position, latching means for retaining each selector element in its searching and operating positions, sensing means movable to a selected sensing position relative to said searching means by movement of a selector element to its searching position, and an operative connection between said sensing means and said latching means whereby actuation of said sensing means by said search means at a selected position causes said latching means to release said selector element to its operative position.

2. The combination as recited in claim 1, wherein control means in said pneumatic circuit means is operable by said selector element in its operative position to deactivate said search means.

3. The combination as recited in claim 2, wherein said pneumatic circuit means includes an air search motor operatively connected to said searching means.

4. The combination as recited in claim 3, wherein said pneumatic circuit means includes an air motor operatively connected to said operative connection for actuation thereof upon completion of a selected cycle whereby said latching means releases said selector element from its operative position.

5. In selecting apparatus for selecting a particular cycle in a multi-cycle system, the combination comprising pneumatic circuit means, electric circuit means controlling said pneumatic circuit means, a plurality of selector elements, each selector element being movable between inoperative and operative positions and a searching position, sensor means operatively connected to said selector elements for movement thereby to a sensing position when one of said selector elements is disposed in its searching position, searching means operatively connected to said pneumatic circuit means for movement relative to said sensor means, said searching means coinciding with said sensing means when in a selected sensing position for actuating said sensing means, an operative connection between said sensing means and said selector elements for moving said one selector element from its searching position to its operative position, and means operated by said one selector element when in its operative position for stopping said searching means whereby said searching means is selectively stopped in the selected sensing position of said sensing means.

6. The combination as recited in claim 5, wherein said pneumatic circuit means includes an intermittently operated air search motor in the form of an expanding and contracting bellows.

7. Selector apparatus for a multi-cycle system comprising a rotatable search disc, a drive shaft fixed to said disc, a cable drum coupled to said shaft for driving the same in a single direction of rotation, a bellows having a fixed end and a movable end, a cable wound on said drum with one end attached to said bellows movable end and another end attached to a return spring, a vacuum pump and pneumatic circuit means communicating with said bellows for evacuating the same whereby contraction of the bellows causes said cable and said drum to rotate said disc, interrupter means in said pneumatic circuit means, actuating means on said cable for transferring said interrupter means upon contraction of said bellows to interrupt evacuation thereof and permit atmospheric pressure to expand said bellows and permit said cable to return in an opposite direction by said spring, said actuating means transferring said interrupter means upon expansion of said bellows to reestablish the evacuation thereof, sensing means cooperative with said disc, a plurality of selector elements movable to searching and operative positions, bar means operable upon movement of a selector element to its search position for moving said sensing means into a selective position relative to said disc, means on said bar means for retaining the selector element in its search position, and latch means operatively connected between said sensing means and said bar means whereby the actuation of said sensing means causes said bar means to release said selector element to its operative position, and control means for said pneumatic circuit means operatively connected to said selector elements whereby movement of said selector element from its searching position shuts off communication between said vacuum pump and said bellows.

8. The combination as recited in claim 7, wherein said control means comprises a diverter valve and a biased actuator therefor, and a cammed lever has an end projection connected to said biased actuator and a portion cammed into operative engagement with said selector element.

9. Selector apparatus comprising a frame, a latch bar and a cam bar slidably carried by said frame, a plurality of notches in said latch bar, a similar plurality of recesses in said cam bar being alignable with said notches, a similar plurality of push button strips on said frame, each of said strips being movable between inoperative, depressed and intermediate positions, resilient means biasing each of said strips to its inoperative position, a latching tab on each strip being movable into a corresponding notch and recess for sliding said latch bar and said cam bar, first and second ledge means in said notch for latching said tab and retaining its strip in its depressed and intermediate positions respectively, a sensing sweep arm movable through an arcuate path defining a similar plurality of selected positions, a rod defining a pivotal axis for said arm, a positioning pin connected to said arm for pivoting the same and being operatively associated with said cam bar whereby movement of said cam bar to a selected position effects selective positioning of said arm, a search disc rotatably carried by said frame and being disposed adjacent said sensing sweep arm for cooperation therewith, pneumatic drive means operatively connected to said seach disc for rotating the same, control means for said pneumatic drive means actuated by the selected one of said strips which is in its depressed position, a similar plurality of search nodes spaced on said disc so that one of said nodes is rotated into engagement with said arm in its selected position for actuating said arm, and its pivotal axis rod, and an operative connection between said rod and said latch bar for moving the same whereby said latching tab on the depressed strip is transferred from the first ledge means to the second ledge means so that said strip is moved to its intermediate position, said control means being actuated by said strip when in its intermediate position whereby the pneumatic drive means is deactivated to stop rotation of said disc.

10. The combination as recited in claim 9, wherein said plurality of nodes are radially and circumferentially spaced from each other whereby said disc will stop at a selected position.

11. The combination as recited in claim 9, wherein each of said notches and said recesses are provided with sloping surfaces to facilitate movement of said latching tab.

References Cited in the file of this patent

UNITED STATES PATENTS

| | | |
|---|---|---|
| 2,821,172 | Randall | Jan. 28, 1958 |
| 2,922,399 | Panissidi | Jan. 26, 1960 |